July 28, 1953   G. W. DUNHAM   2,646,658
LAWN MOWER CONSTRUCTION
Filed Sept. 22, 1949   3 Sheets-Sheet 1
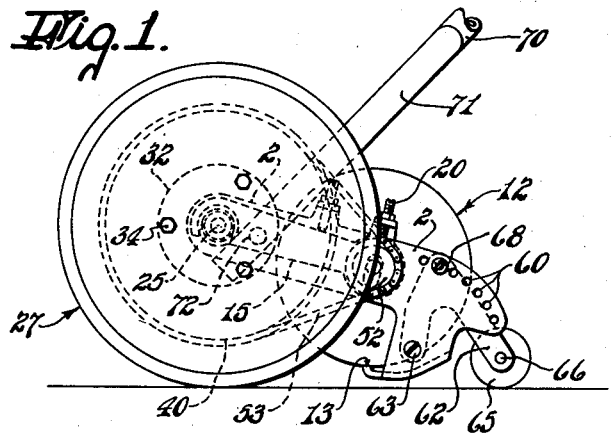
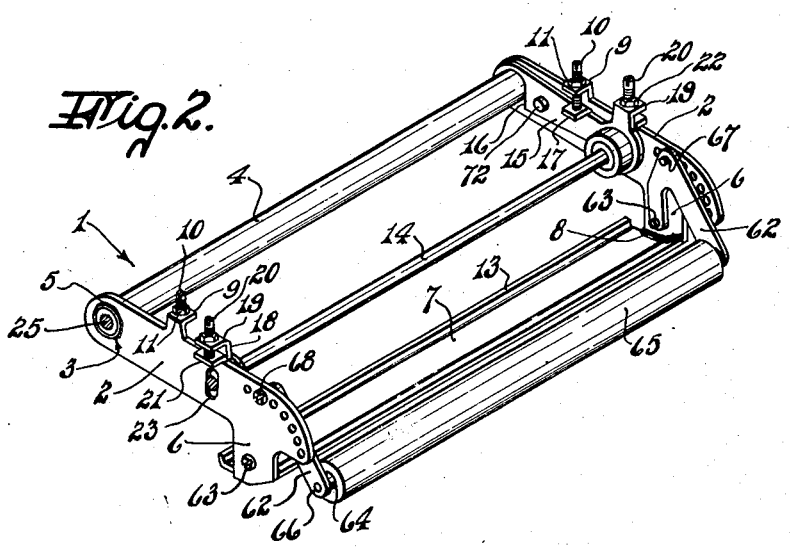
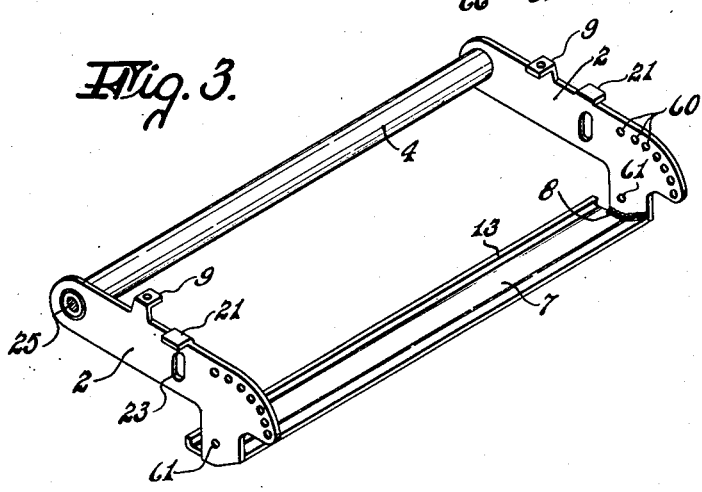
INVENTOR
GEORGE W. DUNHAM
BY Chapin & Neal
ATTORNEYS INVENTOR
GEORGE W. DUNHAM
BY Chapin & Neal
ATTORNEYS July 28, 1953 G. W. DUNHAM 2,646,658
LAWN MOWER CONSTRUCTION
Filed Sept. 22, 1949 3 Sheets-Sheet 3

INVENTOR
GEORGE W. DUNHAM
BY Chapin + Neal
ATTORNEYS

Patented July 28, 1953

2,646,658

UNITED STATES PATENT OFFICE 2,646,658

LAWN MOWER CONSTRUCTION

George W. Dunham, Westport, Conn., assignor to Savage Arms Corporation, Utica, N. Y., a corporation of Delaware Application September 22, 1949, Serial No. 117,084

3 Claims. (Cl. 56—249)

This invention relates to lawn mowers and more particularly to improvements in their frame structure and the form and arrangement of the operating parts in relation to the frame.

One object of the invention is to provide a relatively simple welded frame which is rigid and with the parts so formed and arranged that the manufacture and assembly of the elements is simplified. Another object is to provide an arrangement which facilitates the adjustment of the operative parts.

Other and further objects of the invention which reside in the detailed construction of the parts, their operation and assembly will be made apparent in the following specification and claims.

In the accompanying drawings which illustrate one embodiment of the invention,

Fig. 1 is a side elevational view;

Fig. 2 is a generally perspective view of the frame assembly;

Fig. 3 is a generally perspective view of one of the frame units;

Figure 4:
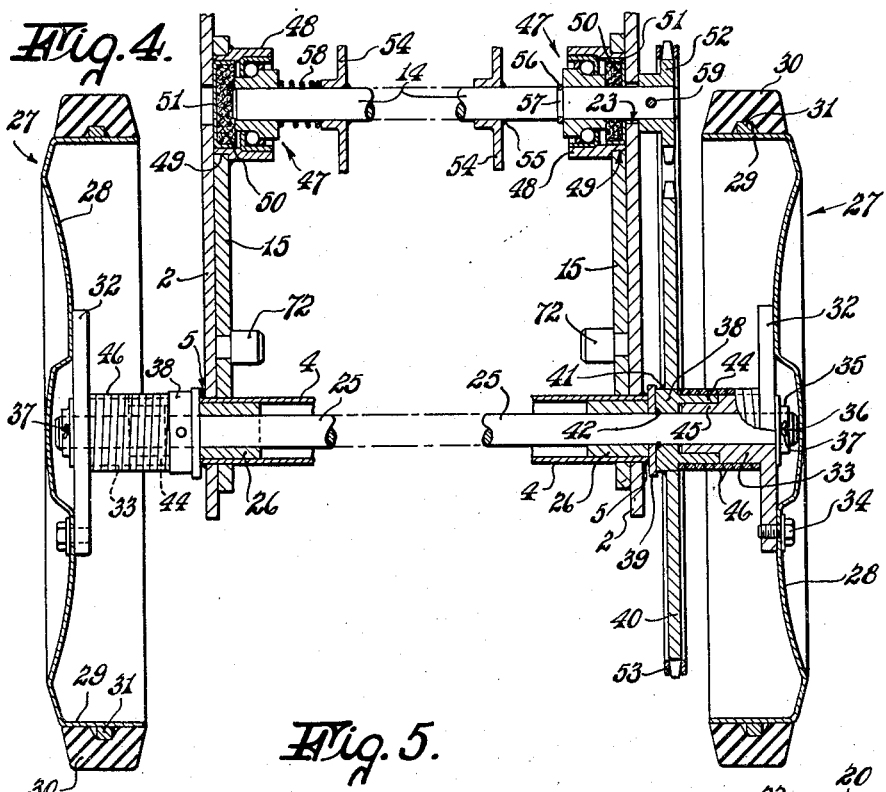
Fig. 4 is an enlarged fragmentary sectional view on a plane through the drive and knife-reel shafts.

Referring to the drawings, the frame is shown as comprising a rectangular frame, generally indicated at 1, which includes side members 2, each provided at their forward end with openings 3 in which the opposite ends of a tubular member 4 are welded as indicated at 5. As later described member 4 forms a housing for the wheel and drive shaft of the mower. The side members 2 are each formed adjacent their rear end with a downwardly directed extension 6. The under-knife 7 of the mower is positioned between the extensions 6 and the ends of the under-knife are welded as at 8 to the end portions of the extensions. The under-knife thus becomes a rigid integral member of the rectangular frame 1. Opposed lugs 9 welded to, or formed integrally with, the side members 2 extend inwardly of the frame and are threaded to receive adjusting screws 10, the screws being provided with check nuts 11 if desired.

The rotary knife-reel of the mower is generally indicated at 12 in Fig. 1 and may be of any usual or desired construction including the usual plurality of knives which cooperate with the sharpened edge 13 of the under-blade 7 to shear the grass in the usual manner. Since the specific reel construction forms no part of the present invention a detailed description of the reel and knives is not believed necessary. The knife-reel is secured to a knife reel shaft 14 rotatably supported at its ends by side members 15 positioned inwardly of and closely adjacent the side members 2 of frame 1. The forward ends of the members 15 are slotted as at 16 to engage hook fashion over the tubular member 4 of frame 1, the slots 16 being preferably shaped to make a wedging engagement with member 4, while providing pivotal movement of the members 15 about the tubular member and permitting the knife-reel shaft to be swung in parallelism with the tubular member about the latter as a center. The upper edges of members 15 are shown provided with inwardly extending welded or integral lugs 17 arranged below the lugs 9 of members 2 in position to be engaged by the adjusting screws 10. The rear ends of members 15 are formed with upwardly directed extensions 18 carrying outwardly directed integral or welded lugs 19. Lugs 19 are threaded to receive adjusting screws 20, the lower ends of which engage lugs 21 welded to, or formed integral with, the side members 2. Screws 20 may be provided with check nuts 22 is desired. As will be apparent advance of screws 10 downwardly tend to move members 15 and reel shaft 14 carried thereby downwardly while downward advance of screws 20 tend to raise the reel and shaft. By suitably setting screws 10 and 20, which are easily accessible, the knives of the reel may be accurately adjusted in proper relation to the cutting edge of the under-knife.

As best shown in Fig. 4, a drive shaft 25 is journaled in the tubular member 4 in axially aligned bearings 26. The shaft 25 extends outwardly of the ends of tubular member 4, and ground engaging driving wheels, generally indicated at 27, are rotatably mounted on the extending ends of the shaft. The wheels 27 may take any suitable form but preferably and as shown they are constructed in the form of stamped metal disks 28 having rim flanges 29 which carry solid rubber tires 30 held in place by projections 31 extending from the faces of flanges 29. The disk members 28 are secured to flanges 32 of hub members 33 by bolts 34 or other suitable means, and the hubs 33 are held in rotatable position on the shaft 25 by flanged washers 35 notched as at 36 to receive cotter pins 37 extending through suitable openings in the shaft. Collars 38 are fixed on the shaft 25 intermediate the hubs 33 and the ends of tubular member 4, washers 39 being positioned between the collars 38 and the ends of members 4.

One of the collars 38, as shown at the right in Fig. 4, carries a sprocket 40, welded at 41 to the collar, the latter in turn being secured to the shaft 25 in any suitable manner as by welding 42. The other collar 38 is preferably pinned to the shaft as at 43 to facilitate assembly. Each collar 38 is formed with a cylindrical extension 44 which telescopes over a cylindrical extension 45 of the hubs 33. The surfaces of extensions 44 and the adjacent surfaces of hubs 33 form a substantially continuous cylindrical surface. The inner surfaces of the extensions 45 increase the bearing surfaces of the wheel hubs on the shaft 25.

Coiled springs 46 frictionally engage the outer cylindrical surfaces of hubs 33 and extensions 44, the spring spirals being wound in a direction counter to the direction of forward rotation of the adjacent wheel 27 as viewed from the adjacent end of the shaft. On forward movement of the mower the convolutions of each spring contract to firmly grip the underlying surfaces of hub 33 and of extensions 44 thus driving the collars 38, and the sprocket 40 which is secured to one of the collars and shaft 25 to which the collars are secured. When the wheels 27 are rotated rearwardly the grip of springs 46 is relaxed and the wheels turn idly on shaft 25. The springs thus form a one-way clutch between the hubs 33 and collars 38 and act as a differential when the shaft is driven by one wheel to overrun the other as in turning.

Figure 5:
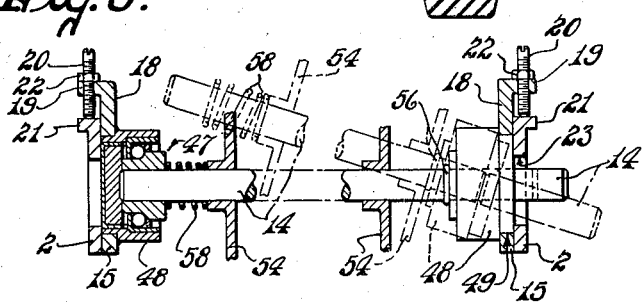
Fig. 5 is a reduced fragmentary sectional view.

As best shown in Figs. 4 and 5 the reel shaft 14 is journaled in ball bearings, generally indicated at 47, which are carried by cylindrical members 48 seating in openings 49 in the frame members 15, the outer ends of cylindrical members 48 being closed by sealing members 50 seated in cups 51. One end of the shaft 14 extends outwardly through the adjacent sealing member 50, cup 51 and opening 23 in frame member 2 and the extending end is provided with a sprocket 52 which is connected by a sprocket chain 53 to sprocket 40.

The reel knives, not shown, are carried by members 54 welded at 55 to the shaft 14 and spaced from each other and from the adjacent bearings 47. The bearing assembly 47 adjacent that end of the shaft which carries sprocket 52 is held in place by a snap ring 56 engaging in a groove 57 in shaft 14, while the bearing assembly 47 at the opposite end of the shaft is held in place in member 48 by a spring 58 compressed between the bearing and the adjacent member 54. This construction provides an economical assembly of the parts. With the sprocket 52 removed and the snap ring 56 and the adjacent bearing assembly 47 together with its members 48, 50 and 51 displaced to a position against the adjacent member 34, all as shown in broken lines in Fig. 5, the sprocket carrying end of the shaft can be inserted through openings 49 and 23 a sufficient distance to permit the opposite end of the shaft to be swung into alignment with its bearing and seated therein, after which the spring ring and the adjacent bearing assembly are moved to the full line operative position. Sprocket 52 is then secured to the shaft as by a pin 59.

As shown in Figs. 1, 2 and 3 each frame member 2 is provided with a series of spaced openings 60 arranged in an arc around an opening 61 as a center. Generally V shaped members 62 are pivotally connected to the frame members 2 by screws 63 threaded in openings 61. The ends of a shaft 64 carrying a ground engaging roller 65 are journaled in openings 66 formed in the free ends of members 62. The members 62 are formed with openings 67 to receive the ends of pins 68 threaded in selected opposed pairs of the openings 60 so that the roller 65 supports the under-blade 7 at the desired adjusted height above the ground. As will be apparent from Fig. 1 the arcuate arrangement of the openings 60 provide a relatively fine adjustment at the upper end of the arc which covers the close cutting range while the adjustment is coarser at the lower end of the arc which covers the high cutting range of adjustment.

The mower is adapted to be propelled in the usual manner by a handle 70 (which is preferably of tubular stock) having at its lower end forked arms 71, the ends of which are pivotally engaged on studs 72 carried by frame members 15.

Figure 8:
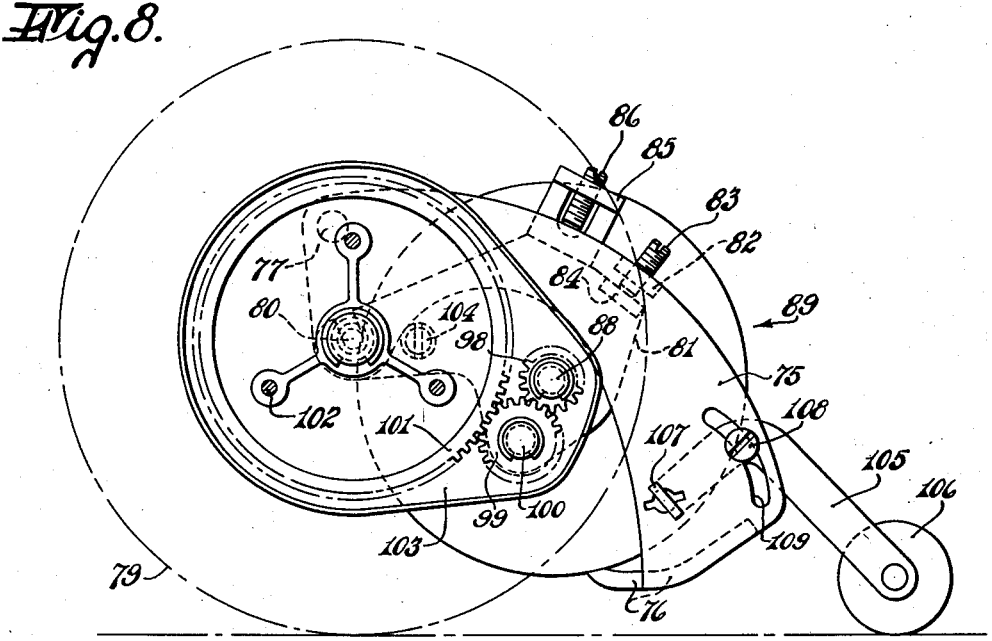
Fig. 8 is a side elevational view showing an alternative structure.
Figure 9:
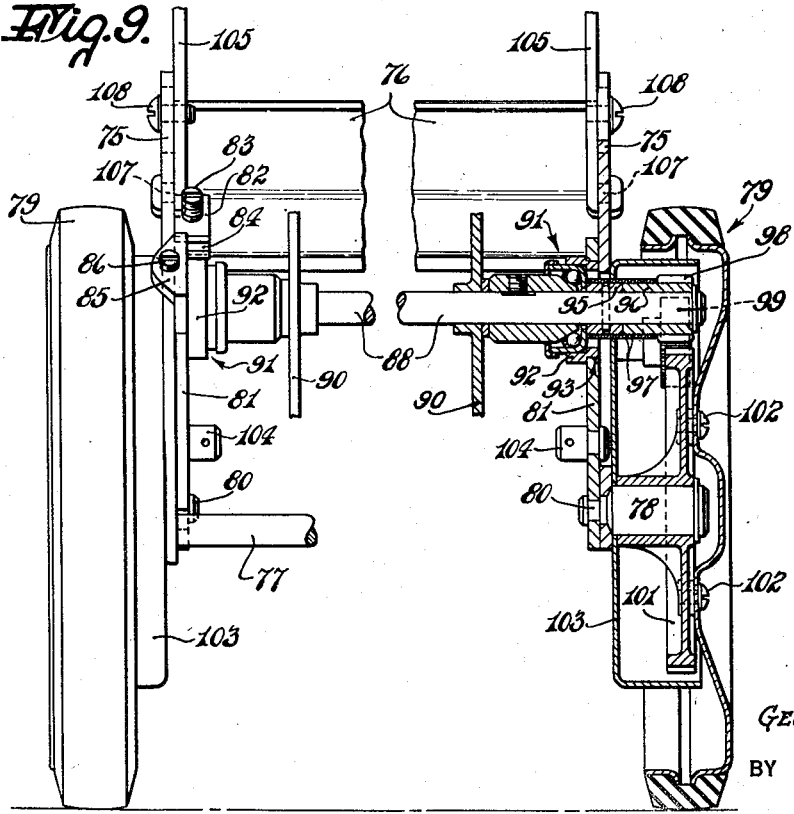
Fig. 9 is a plan view, partly in section of the structure shown in Fig. 8.

An alternative arrangement of the parts is shown in Figs. 8 and 9 in which the one-way spring clutches are carried by the knife reel shaft.

As shown in Figs. 8 and 9 the frame comprises two spaced members 75 which correspond to side members 2—2 previously described. The fixed under-blade 76 is welded or otherwise secured to the rear ends of members 75 while their forward ends are connected by a spacing rod 77. The forward ends of members 75 carry outwardly extending bearing shafts 78 upon which ground engaging driving wheels 79 are mounted as later described, and inwardly extending studs 80 aligned with bearings 78 on which side members 81, corresponding to side members 15 previously described, are pivoted. Side members 75 are provided with lugs 82 which are threaded to receive adjusting screws 83 which engage lugs 84 on frame members 81, and the latter frame is provided with threaded lugs 85 to receive screws 86 which engage the upper edge of frame members 75. By suitably adjusting and tightening screws 83 and 86 the frame members 75 and 81 may be adjusted relative to each other.

Shaft 88 carries the cutting reel generally indicated at 89 which as previously stated may be of any usual or desired construction, the reel knives, not shown, being carried by members 90, welded or otherwise secured to the shaft 88.

The shaft 88 is journaled in suitable ball bearings generally indicated at 91 which are carried by cylindrical members 92 fitted in openings 93 in frame members 81. The opposite ends of shaft 88 extend outwardly through the adjacent members 92, as shown at the right in Fig. 9. The construction and driving connections at each end of the shaft are the same, except for the direction of pitch of the clutch springs, as later described, a description of the structure at the right end of shaft 88 as shown in Fig. 9 will serve for both. Outwardly of the ball bearing a collar member 95 is fixed to the shaft 88 and outwardly of member 95 a cylindrical member 96 is rotatably mounted on the shaft. Members 95 and 96 are frictionally engaged by coiled spring 97, the members 95—96 with their spring 97 forming a one-way clutch at each end of the shaft like in function and purpose to the clutch 44—45—46 previously described.

The outer end of members 96 are formed with gear teeth 98 which mesh with a pinion 99 mounted on a stub shaft 100 carried by adjacent frame member 81. Pinion 99 meshes with a large driving gear 101 rotatably mounted on shaft 78 and to which the ground engaging wheel 79 is received as by screw bolts 102. The gearing is provided with a casing 103 which with wheels 79 substantially encloses the gears.

Members 81 are provided with studs 104 corresponding to previously described studs 72. Angular arm members 105 carry roller 106, the arms 105 being pivoted to frame members 75 as at 107 and held in adjusted position by screws 108 extending through arcuate slots 109 in the frame members.

Figure 6:
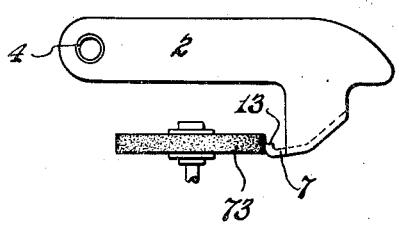
Figs. 6 and 7 are diagrammatic views showing the manner of grinding the cutting edge of the under-knife.
Figure 7:
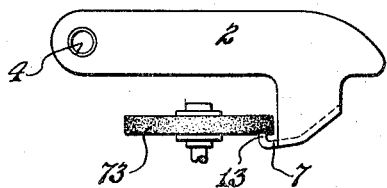

In the frame construction of both forms described the under-blade is a rigid member with side frames and a cross tie, and this construction in addition to its other advantages, permits an efficient sharpening of the cutting edge 13 of the blade. As diagrammatically shown in Fig. 6, using the frame of Fig. 3 for illustration, the frame assembly comprising the side members 2, tubular member 4 and blade 7 can be mounted in a suitable carriage, not shown, for reciprocation, in the line of the axis of the tubular member, past a grinding disk 73, first to grind the vertical face of the cutting edge 7 in exact parallelism with the axis of tubular member 4 as shown in Fig. 6, and then to grind the upper face of the cutting edge as shown in Fig. 7. The procedure would be the same using the frame made up of side members 75, under blade 76 and tie rod 77.

My invention provides a lawn mower construction of extreme simplicity in which the casting and machining of parts may be reduced to a minimum or eliminated by the use of stampings welded or otherwise secured together. As a result a stronger and less expensive device is provided than is possible with conventional constructions.

What I claim is:

1. In a lawn mower, a frame comprising spaced side members, an under-blade rigidly secured in fixed position to and between rear end portions of said side members, said side members carrying axially aligned bearings adjacent their forward ends, a second pair of members respectively connected at one end to said first-mentioned side members for pivotal movement about the axis of said bearings, a cup-shaped bearing carried at the free end of each of said second pair of members, a shaft mounted in said-last-named bearings, spaced reel knife supporting members fixed to said shaft intermediate its ends, a compression spring engaged between one of said supporting members and the adjacent bearing to normally hold the latter in place, the other end of said shaft extending through openings formed in the adjacent bearing and side members, and having a driving member removably secured thereto outwardly of the side members, means on the shaft normally holding the last-mentioned bearing in place, said means being releasably connected to the shaft to permit the shaft to be slid axially through said several openings to allow the other end of the shaft to be seated in its bearing, and interengaging means carried by said first and second pairs of side members for holding the latter in adjusted position relative to each other.

2. In a lawn mower, a frame comprising spaced side members, aligned bearings carried by said frame side members, an under blade positioned between said members rearwardly of said bearings and having its ends rigidly connected to the adjacent frame side member, a knife reel shaft, a pair of rigid side members connecting said knife reel shaft to said frame side members for pivotal movement around, and in parallelism with, the axis of said aligned bearings, set screws threaded through each of the frame side members into abutting engagement with the adjacent rigid side member, and set screws threaded through each of the rigid side members into abutting engagement with the adjacent frame side member for holding said rigid side members and the reel shaft carried thereby in adjusted position relative to the under blade.

3. In a lawn mower, a frame comprising spaced side members, aligned bearings carried by said frame side members, an under blade positioned between said members rearwardly of said bearings and having its ends rigidly connected to the adjacent frame side member, a knife reel shaft, a pair of rigid side members connecting said knife reel shaft to said frame side members for pivotal movement around, and in parallelism with, the axis of said aligned bearings, an inwardly and an outwardly directed lug extending from the upper edge of each of said frame side members and said rigid side members, the similarly directed lugs carried by adjacent members being in substantially vertical alignment, and set screws threaded through each upper lug into abutting engagement with the lug aligned therewith for holding said rigid side members and the reel shaft carried thereby in adjusted position relative to the upper blade.

GEORGE W. DUNHAM.

References Cited in the file of this patent

UNITED STATES PATENTS

| Number | Name | Date |
|---|---|---|
| 1,935,683 | Wemp | Nov. 21, 1933 |
| 2,301,059 | Limbach | Nov. 3, 1942 |
| 2,378,488 | Lowe et al. | June 19, 1945 |
| 2,388,165 | Lowe et al. | Oct. 30, 1945 |
| 2,477,453 | Harley | July 26, 1949 |

FOREIGN PATENTS

| Number | Country | Date |
|---|---|---|
| 379,462 | Great Britain | Sept. 1, 1932 |
| 437,454 | Great Britain | Oct. 30, 1934 |